(12) United States Patent
Lapalme et al.

(10) Patent No.: US 6,753,899 B2
(45) Date of Patent: Jun. 22, 2004

(54) METHOD AND APPARATUS FOR TELEPRESENCE

(75) Inventors: Marie Lapalme, Boucherville (CA); Luc Ducas, Boucherville (CA)

(73) Assignee: Audisoft, Boucherville (CA)

( * ) Notice: Subject to any disclaimer, the term of this patent is extended or adjusted under 35 U.S.C. 154(b) by 0 days.

(21) Appl. No.: 10/232,418

(22) Filed: Sep. 3, 2002

(65) Prior Publication Data

US 2004/0041904 A1 Mar. 4, 2004

(51) Int. Cl.[7] .................................................. H04N 7/14
(52) U.S. Cl. ............................. 348/14.01; 348/14.02; 340/505; 345/8
(58) Field of Search ........................... 348/14.01–14.09, 348/14.11–14.13, 61, 143, 207.99; 340/505; 345/8

(56) References Cited

U.S. PATENT DOCUMENTS

| | | | |
|---|---|---|---|
| 5,850,250 A | 12/1998 | Konopka et al. | |
| 5,861,994 A | 1/1999 | Kelly | |
| H1790 H | * 3/1999 | Coleman | ................. 348/14.01 |
| 5,879,289 A | 3/1999 | Yarush et al. | |
| 5,933,479 A | 8/1999 | Michael et al. | |
| 5,973,728 A | 10/1999 | Levitan | |
| 6,028,627 A | 2/2000 | Helmsderfer | |
| 6,046,712 A | 4/2000 | Beller et al. | |
| 6,211,093 B1 | 4/2001 | Sandhu et al. | |
| 6,236,735 B1 | 5/2001 | Bjorner et al. | |
| 6,307,526 B1 | 10/2001 | Mann | |
| 6,317,039 B1 | * 11/2001 | Thomason | ................... 340/505 |
| 6,342,915 B1 | * 1/2002 | Ozaki et al. | ................... 348/61 |
| 2002/0030637 A1 | 3/2002 | Mann | |

FOREIGN PATENT DOCUMENTS

| | | | | |
|---|---|---|---|---|
| JP | 2000-134614 | * 5/2000 | ............ | H04N/7/18 |
| WO | WO01/074080 A1 | 10/2001 | | |
| WO | WO01803212 A1 | 10/2001 | | |

OTHER PUBLICATIONS

Sharing Viewpoints in Collaborative Virtual Environments, Dept. of Electrical and Computer Engineering–The State University of New Jersey, Steve Valin et al., pp. 1–10.

* cited by examiner

Primary Examiner—Melur Ramakrishnaiah
(74) Attorney, Agent, or Firm—James Anglehart; Ogilvy Renault

(57) ABSTRACT

A method for telepresence between a field user wearing telepresence equipment and a remote user, the method comprising: providing the telepresence equipment including a global camera, a handheld detail camera for obtaining image close-ups, and an audio link for communication between the field user and the remote user; mounting the global camera on the field user's head to obtain an image of the field user's viewpoint; transmitting images from the global camera to a remote display for the remote user to view; receiving instructions from the remote user through the audio link on where to point the detail camera; pointing the detail camera to specified objects; and transmitting images from the detail camera to the remote display for the remote user to view.

17 Claims, 6 Drawing Sheets

METHOD AND APPARATUS FOR TELEPRESENCE

FIELD OF THE INVENTION

The invention relates to systems used for telepresence. More specifically, it relates to systems used for remote support from experts to users in the field or at home.

BACKGROUND OF THE INVENTION

Many systems already exist for field workers to receive help from an expert remotely located. These systems are not simply cordless headsets, but comprise a camera attached to a headset that allows a remotely located person to view what the user is viewing. The remote person can see what the user is seeing and speak to the user via a speaker. The user can also communicate with the remote person using a microphone.

These systems have a multitude of applications, ranging from the medical field and the industrial field, to the telecommunications field. Having an expert to consult as if he or she was standing next to you is quite valuable.

Moreover, these systems could also be used for remote technical support. Users sitting at home and having computer problems could greatly benefit from an apparatus that allows them to contact a person that could see what they are seeing and be able to guide them through solving their problems. The same could be done with electrical problems encountered in the home. A person who can view what a user is doing can easily guide the user through simple electrical repairs.

The system can also be used for training. The expert can wear a headset-camera system to demonstrate a procedure to a technician who watches the display.

However, the existing telepresence systems are bulky and impractical. Because the cameras attached to the headsets are heavy, the apparatus requires an image stabilizing process in order to provide a clear image. An example of this can be seen in U.S. Pat. No. 6,342,915, issued to Ozaki et al.

Another disadvantage to the existing telepresence systems is the lack of detail that can be viewed by the remotely located person. The camera that is provided produces an image of the field of view of the user, but without the details. It is more of a global view. However, if the user advances too closely to the target image, then the image is out of focus.

In cases such as technical problems that a user is to be guided through, it would be advantageous to have a close-up view in addition to the general view already provided.

Moreover, since it is essential in a remote support setting to facilitate the communication between the user and a remote helper, there is a need to improve the current telepresence systems such that the remote helper can have access to all the necessary information in order to solve the problems encountered.

SUMMARY OF THE INVENTION

Accordingly, an object of the present invention is to facilitate communication between a field user of telepresence equipment and a remote user.

Another object of the present invention is to increase the consultation of experts while minimizing the displacements of the experts.

According to a first broad aspect of the present invention, there is provided a method for telepresence between a field user wearing telepresence equipment and a remote user, the method comprising: providing the telepresence equipment including a global camera, a handheld detail camera for obtaining image close-ups, and an audio link for communication between the field user and the remote user; mounting the global camera on the field user's head to obtain an image of the field user's viewpoint; transmitting images from the global camera to a remote display for the remote user to view; receiving instructions from the remote user through the audio link on where to point the detail camera; pointing the detail camera to specified objects; and transmitting images from the detail camera to the remote display for the remote user to view.

Preferably, the global camera is a video camera, the detail camera comprises a switch to initiate and stop transmission of close-up images, and the detail camera has a light to illuminate its field of view. The detail camera is attached to a transmitter module using a coil cord or straight cable. The transmitter module is worn at the waist and includes batteries, a transmitter, and connectors for the detail camera and the global camera.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
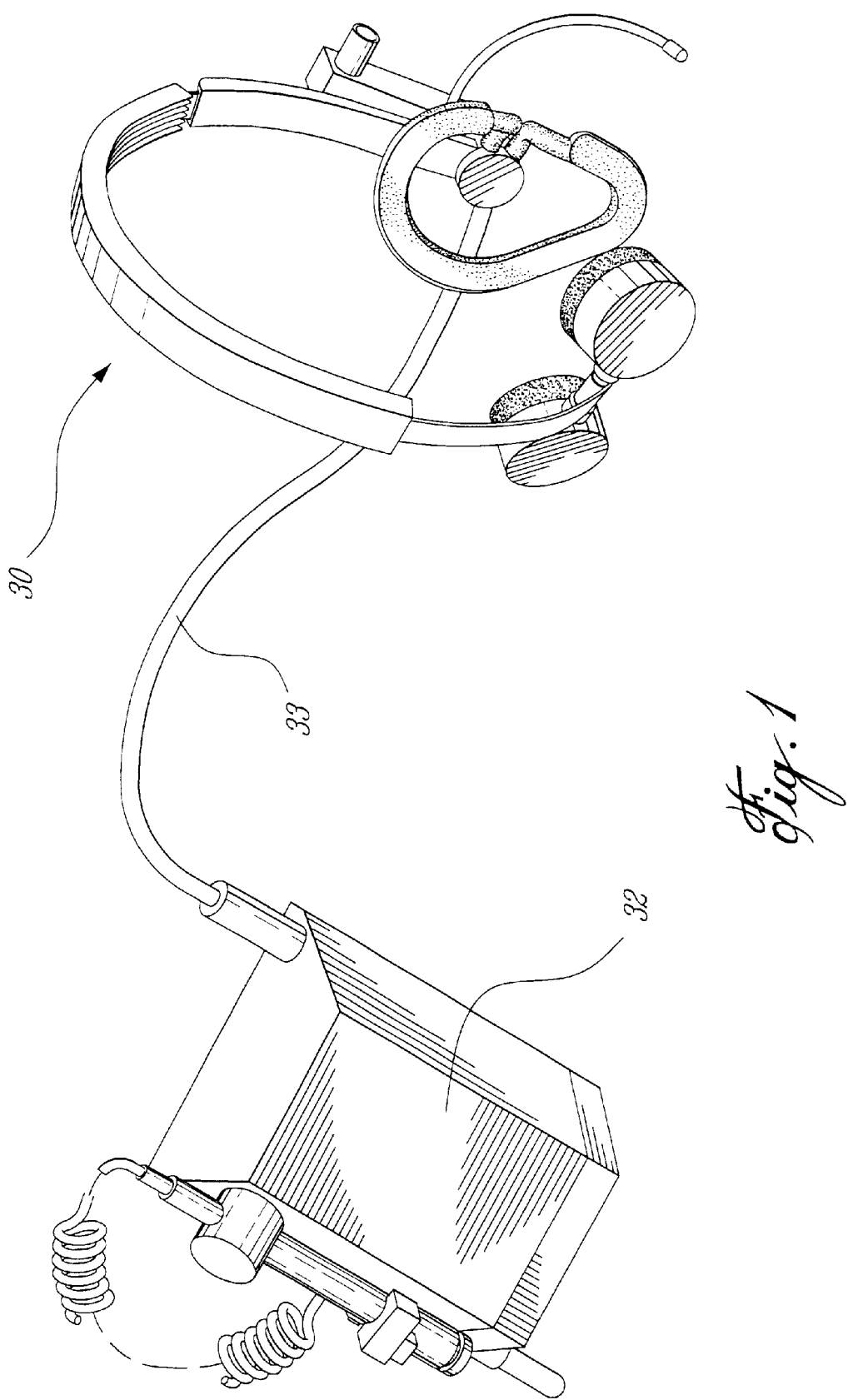
FIG. 1 is a schematic of the portable apparatus.

FIG. 1 depicts the portable apparatus to be worn by a user. It consists of a headset 30 connected to a power pack 32 that can be worn at the belt. The power pack 32 comprises the battery, electronics for transmitting and receiving audio and video signals, video compression electronics, an antenna, and connectors for both cameras. The power pack 32 and headset 30 are linked by a cable 33. Alternatively, the connection between the two could be wireless (not shown) and a battery would be integrated into the headset.

Figure 2:
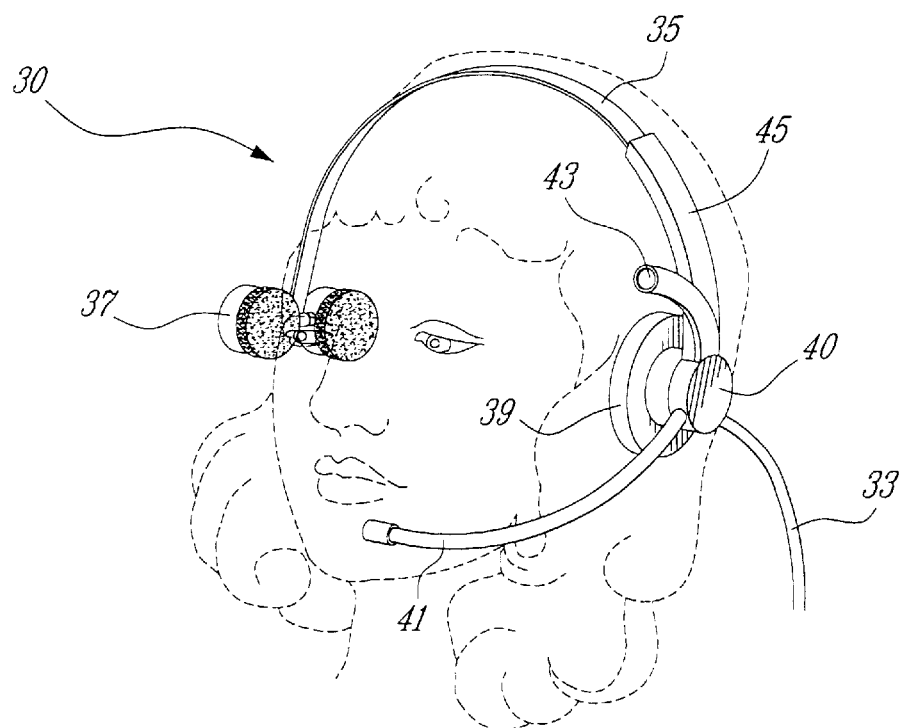
FIG. 2 is a view of the headset on a user.

FIG. 2 shows the headset portion more clearly. A headband 35 is worn around the head to support the apparatus. One end of the headband is formed of two pad-like support means 37 to enable the headset to remain stable. In the preferred embodiment, the pad-like support means 37 are cushioned on one side to rest against the head of the user and hard on the other side to provide more stability to the headset. Alternatively, any type of support means may be used to allow the headset to reside in a stable manner on a user's head. A second end of the headband covers one of the user's ears. A speaker 39 is connected to a connector portion 40 of the headband and rests on the user's ear. Alternatively, a user can use the speaker of a computer or of a video-conferencing system to receive audio signals. A microphone 41 extends outwards from the connector portion 40 towards the user's mouth. The connecting cable 33 also extends from the connector portion 40. A first camera 43 is attached to the headset on the connector portion 40. It is at substantially eye level but does not obstruct the user's view. The camera 43 is a global camera that captures the perspective view of the user. The headset is adjustable in length via a grooved plastic member 45 into which the headband 35 is inserted. The headset is always centered in the middle of the ear. As it is based on a human scale, the camera 43 and microphone 41 are automatically leveled properly.

Figure 3:
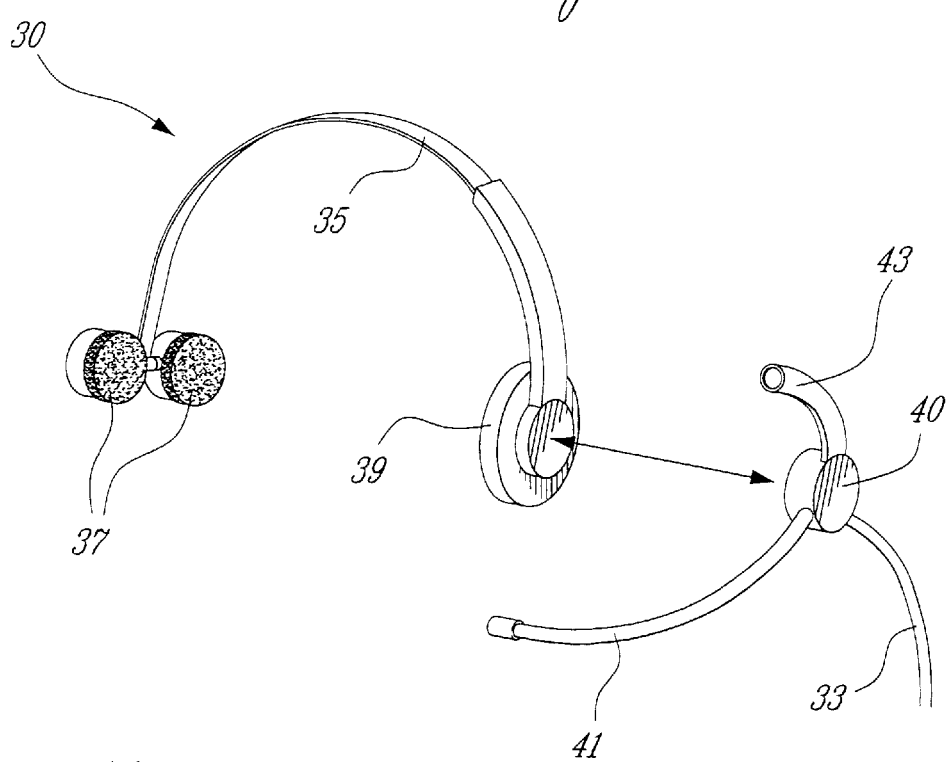
FIG. 3 is a view of the detachable portion of the headset.

FIG. 3 shows how a portion of the headset is detachable. The connector 40, camera 43, microphone 41, and cable 33 can be detached from the headset 30, leaving behind the headband 35, speaker 39, and support means 37. The camera 43 can then be handled manually, capturing a viewpoint different than the user's viewpoint. The user can manipulate the camera to see images that otherwise would not be accessible. The camera 43 and microphone 41 are also detachable for transportation purposes. Alternatively, it is possible to detach only the camera 43 and use it as a hand-held camera while keeping the speaker 39 and microphone 41 attached to the headset 30.

Figure 4:
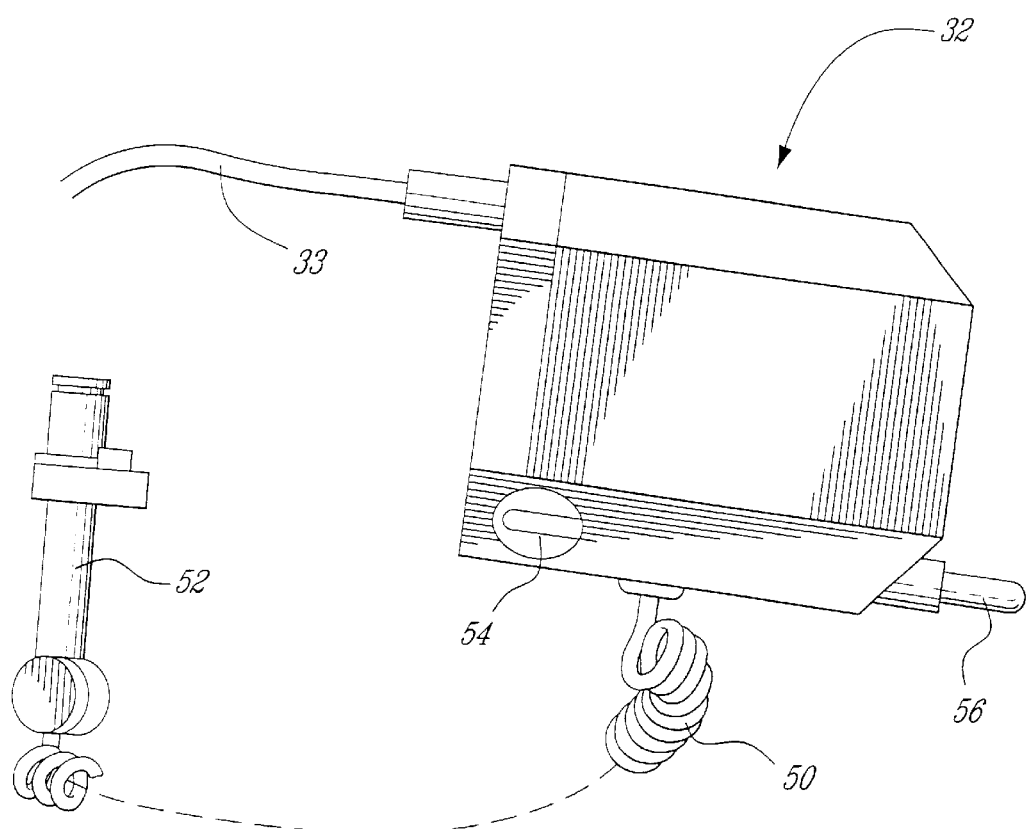
FIG. 4 is a view of the power pack and detail camera.

FIG. 4 shows the portable power pack 32 and a second camera 52. The second camera 52 is handheld and for viewing details. It is attachable to the power pack 32 via a connecting piece 54 on the exterior housing of the processor 32. A coil cord 50 connects the camera 52 to the power pack 32. Alternatively, the connection can be wireless. A small antenna 56 is also present on the power pack 32 to transmit the images captured by the first camera 43 and the second camera 52 wirelessly. Alternatively, this antenna 56 can be replaced by a wire, wherein the power pack 32 is connected directly into a system such as a computer. The back of the housing of the power pack 32 comprises a clip (not shown) to wear the apparatus on a belt.

Figure 5:
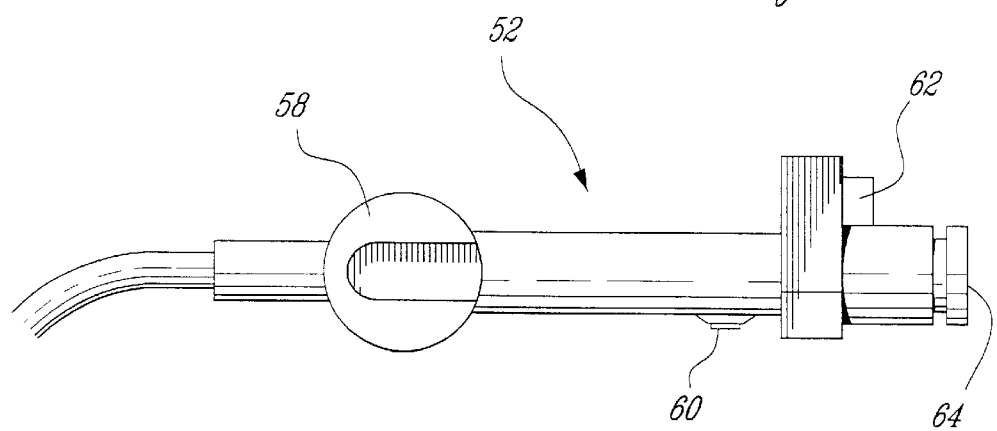
FIG. 5 is a view of the detail camera

In FIG. 5, the detail camera 52 is depicted. A connector 58 is present in order to attach the camera 52 to the complementary connecting piece 54 on the exterior housing of the power pack 32. A small button 60 turns the camera 52 on or off. The button 60 can be a switch or a slide button. When the button 60 is pressed, the camera 52 is capturing images. When the button 60 is released, the camera 52 is no longer capturing any images and the images transmitted come from the global camera 43. A small light 62 is present above on the camera 52 above the lens 64 to illuminate the object being imaged. The light 62 is not always turned on when using the detail camera 52. In some situations, the light may reflect back into the image and have a negative effect. Alternatively, a laser could be present instead of the light 62 to allow the user to align the camera 52 properly with its target. Other aligning mechanisms are also possible. Furthermore, the detail camera 52 may comprise a focusing mechanism, such as a zoom lens.

Figure 6:
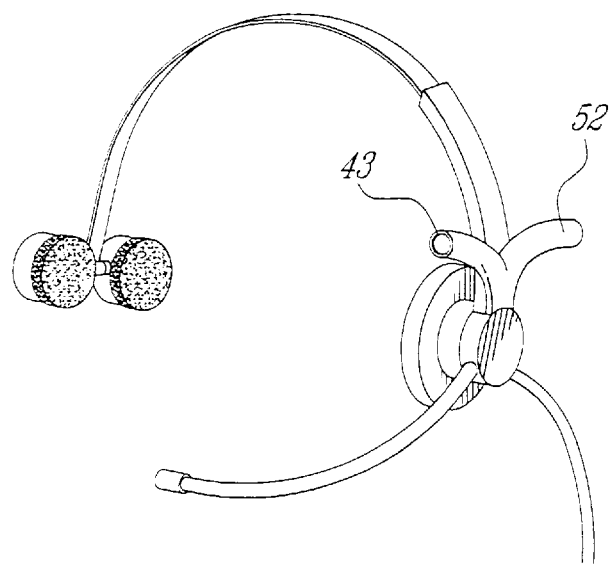
FIG. 6 is an alternative embodiment of the headset.

Alternatively, the two cameras 43 and 52 can be attached together, as seen in FIG. 6. The two are attached to the headset, one camera facing a direction while the other camera faces the opposite direction. The user can choose between a wider view and a narrower view by rotating the dual camera piece by 180 degrees. The cameras can be detached from the headset and handled manually, giving the user the freedom of which view to present to the remotely located expert.

Figure 7:
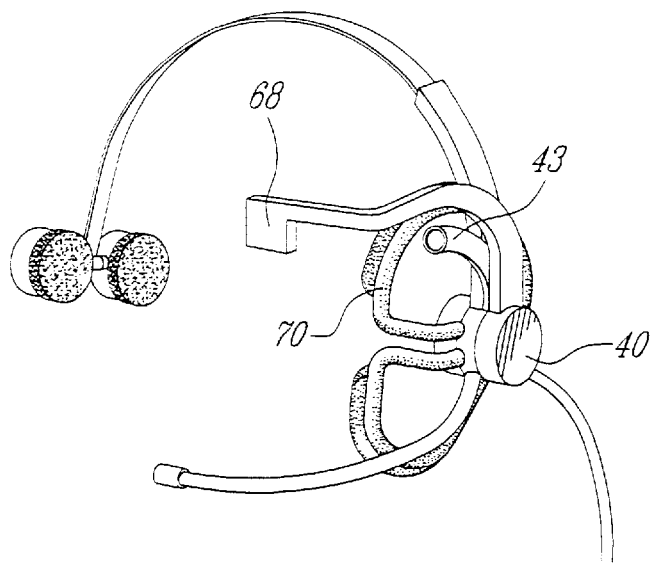
FIG. 7 is another alternative embodiment of the headset.

FIG. 7 shows yet another alternative embodiment for the headset. In this case, only one camera 43 is present on the headset, the second camera being worn at the belt (not shown). However, a Liquid Crystal Display (LCD) 68 is also attached to the headset. The LCD displays what is being viewed by the camera. When the image is coming from the global camera 43, the image on the LCD 68 seen is the global one. When the image is coming from the detail camera 52, the image on the LCD 68 is the detail one. Alternatively, the two images may be viewed simultaneously on the LCD 68. A picture-in-picture type of display is used, with the detail camera 52 image being displayed in a small corner within the image of the global camera 43 image. The LCD 68 is placed at eye level slightly above the camera 43. If desired, the LCD can pivot backwards and be pushed out of the way when not in use (not shown).

Also seen on FIG. 7 is an earpiece 70 instead of a big speaker 39 as shown in FIG. 2. The earpiece 70 is placed around the ear and rests against the head to provide stability to the headset. A smaller speaker (not shown) is present on the inner part of the connector 40 for the user to hear any voice communications from the remote expert.

Figure 8:
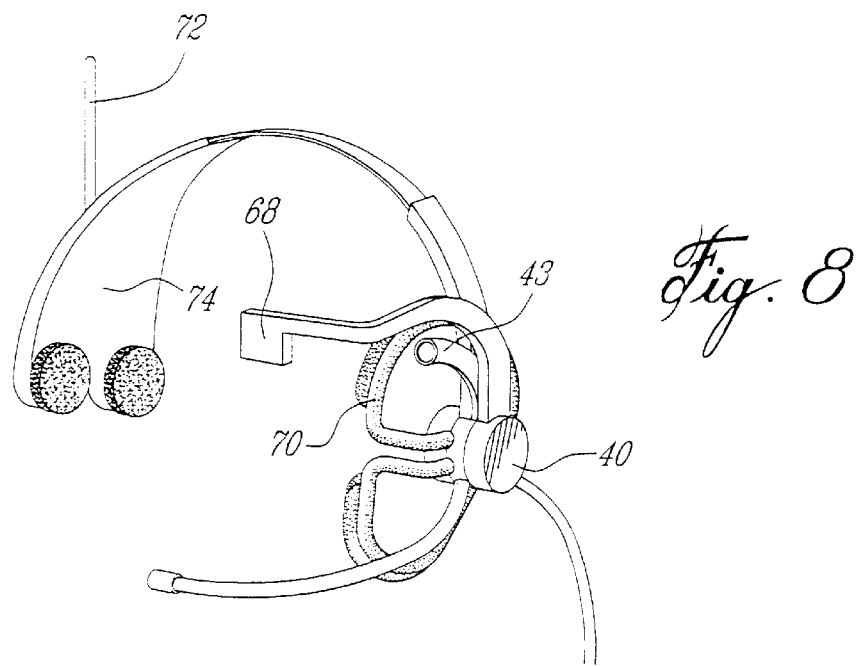
FIG. 8 is yet another alternative embodiment of the headset.

FIG. 8 shows a wireless version of the headset. An antenna 72 is present on one side of the headset for receiving and transmitting voice and data signals. Batteries 74 are placed inside the headband. There are two transmission options available: digital or analog transmissions for video and audio signals. Alternatively, a transmission can be done via a cellular phone.

Figure 9:
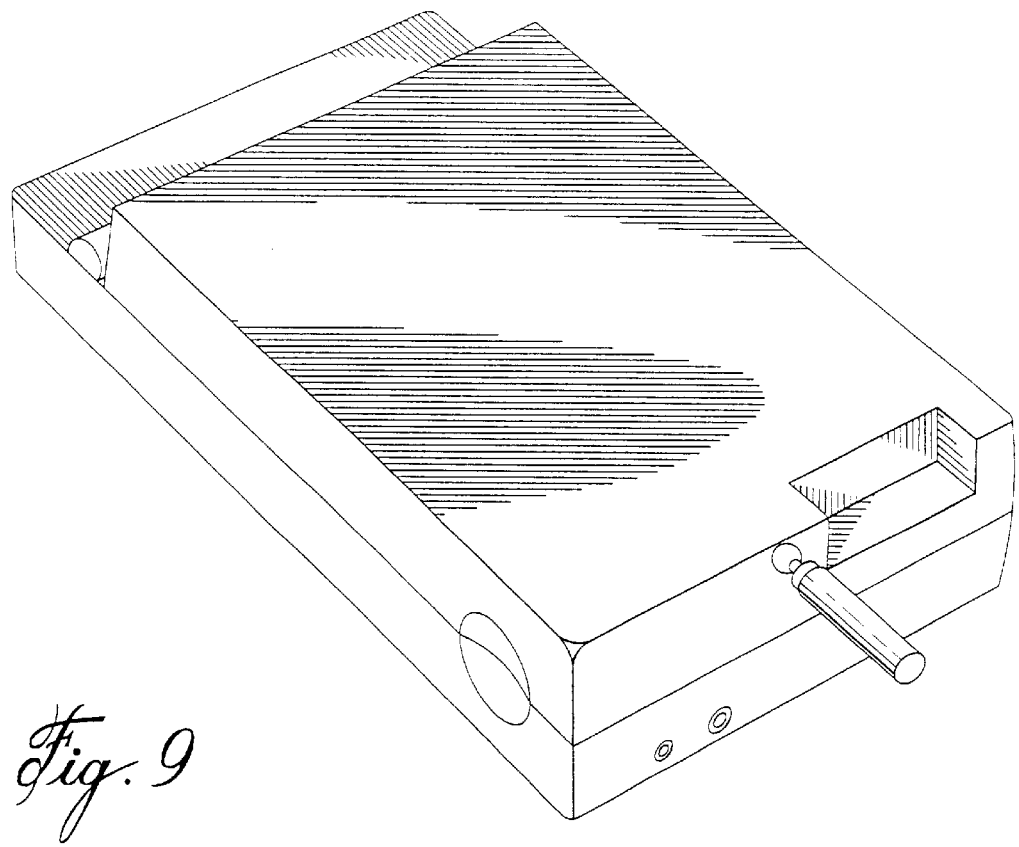
FIG. 9 is a view of the remote viewing device.

FIG. 9 shows the device that can be used by a person at a remote location to communicate with the user or by the user local in order to provide feedback images of what is being displayed. The device flips open to provide a screen wherein the camera images viewed by the user appear. The images are received continuously and are therefore viewed in real time with a minimum amount of delay time. A microphone output is provided in the back, along with a video output and an audio output. Therefore, earphones, speakers, microphones, and other types of input and output devices may be connected to the apparatus. An AC connector is used to power up the device by connecting it to a power outlet. The device may have an infrared port to transmit and receive data via infrared. Alternatively, a battery is used to power up the device.

Since more than one type of data is being transmitted (voice, images, control signals, etc), two frequency bands may be used. Alternatively, both voice and image information can be sent and received on one frequency band. Also alternatively, images from the global camera 43 can be sent on one frequency band and images from the detail camera 52 can be sent on a second frequency band. Voice is then sent on a third frequency. The data can be in digital or analog format. When the data transmitted is in a digital format, wireless Local Area Network (LAN) protocols such as 802.11a or 802.11b are used. In this case, the power pack 32 first converts the analog signal into a digital signal. Then, a compression is done using MPEG 4 (for example). The signal is then transmitted using 802.11x and TCP/IP over a LAN, or any communication protocol such as for a cellular phone. The streamed data can then be routed onto the LAN to a PC. When using an analog transmission, a receiver is connected to a PC, a monitor, a television, or even a projector.

Alternatively, The remote expert can view the images via the web. The cameras on the headset can be a webcam and the data can be transmitted via the internet. A website can be dedicated to this purpose. The device may also have a USB port to connect itself to a PC, a firewire 1394 port, or any equivalent.

The images that appear to the remote user may be from the global camera and detail camera simultaneously. This can be done via a picture-in-picture set-up or a split-screen setup. Alternatively, images from one camera are viewed at one time.

Preferably, both cameras are color high resolution cameras to provide crisp and focused images. The cameras 43 and 52 may have interchangeable lenses. The lenses used have focal lengths that can range between 2–25 mm. The same lens can be used in both cameras and provide a different effect due to the proximity to the object that is being imaged.

Figure 10:
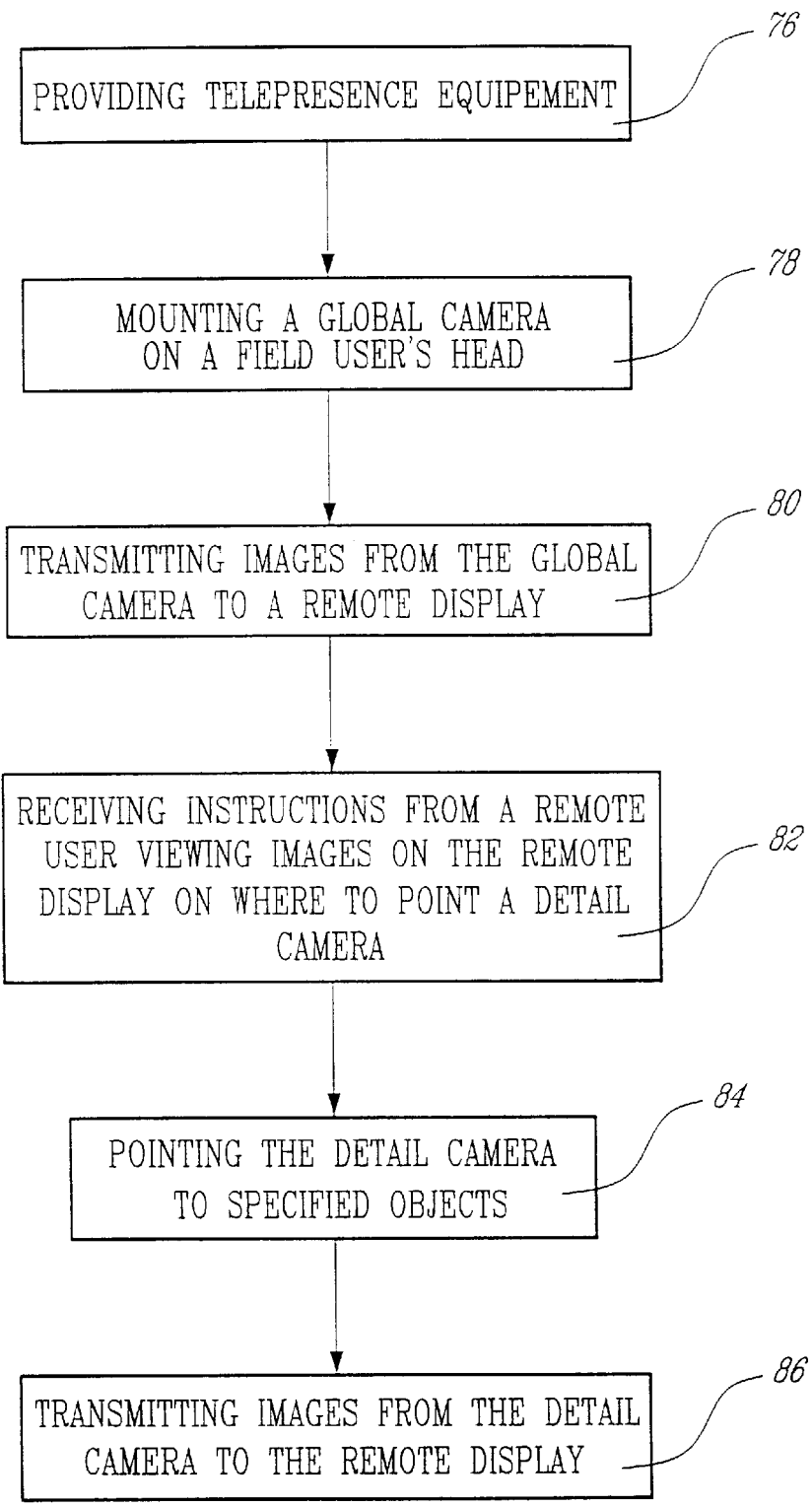
FIG. 10 is a flowchart of the method of the invention.

In FIG. 10, the method for telepresence is illustrated. First, telepresence equipment is provided 76. The equipment comprises a global camera, which can be a video camera or a still camera, a detail camera for close-up views, and an audio link. For the audio link, the communication is to be two way. Therefore, the minimum required is a microphone and a speaker. The next step is to mount the global camera on the head of the field user 78. The camera can be mounted on the left or right side of the head or on top of the head. The camera must move with the field user in the same direction as the head moves. Preferably, the camera is mounted onto a headband placed on the field user's head and is at substantially eye level.

Once the global camera is on the field user's head, images are to be transmitted from the global camera to a remote display 80. A power pack is used to power up the camera and a switch turns it on. A remote user views the images on the remote display. The field user then receives instructions from the remote user on where to point a detail camera 82. The field user points the detail camera to specified objects 84 and the images from the detail camera are transmitted to the remote display 86.

By placing the detail camera in very close proximity to an object, a high spatial resolution is obtained. For the purpose of this invention, high spatial resolution means the number of pixels per inch on an object. The global camera provides a very low spatial resolution for each object viewed while the detail camera provides a high spatial resolution.

A preferred embodiment comprises using the apparatus described above. The global camera sits in a stable manner on the field user's head. The field user has a power pack worn at the waist to power the camera and transmit the images wirelessly, or through a long cable, such as a 30 foot cable. The power pack also comprises a connector hook to attach the detail camera. Therefore, the field user has his hands free until the detail camera is unhooked from the power pack and pointed to a specific object. A light on the detail camera is provided to illuminate the field of view of the detail camera. When the remote user has seen what was asked for, the detail camera is placed back onto its connector hook and the field user can follow instructions from the remote user on how to complete the task at hand.

It can be appreciated that the described apparatus may be used by home owners to speak to technical support personnel for help with their computer. It can also be used for guidance to solve electrical or plumbing problems in the home. It can also be used by field workers who need access to experts that are not present in the field, for example working on power towers, in mines, in sewers, etc.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for telepresence between a field user wearing telepresence equipment and a remote user, the method comprising:

providing said telepresence equipment including a global camera, a handheld detail camera for obtaining image close-ups, and an audio link for communication between said field user and said remote user;

mounting said global camera on the field user's head to obtain an image of the field user's viewpoint;

transmitting images from the global camera to a remote display for said remote user to view;

receiving instructions from said remote user through said audio link on where to point the detail camera;

pointing said detail camera to specified objects; and transmitting images from the detail camera to said remote display for said remote user to view.

2. A method as claimed in claim 1, wherein pointing said detail camera further comprises removing said detail camera from a hook, pointing said detail camera to specified objects, and replacing said detail camera on said hook.

3. A method as claimed in claim 1, wherein said transmitting images and said receiving instructions further comprises transmitting images and receiving instructions through a wireless network.

4. A method as claimed in claim 1, wherein said transmitting images and said receiving instructions further comprises transmitting images and receiving instructions through the internet.

5. A method as claimed in claim 1, wherein pointing said detail camera to specified objects further comprises pressing a switch on said detail camera to begin transmission of close-up images and releasing said switch to end transmission of said detail images.

6. A method as claimed in claim 1, further comprising providing a second display for said field user to view the images.

7. A method as claimed in claim 6, wherein said second display is mounted to said field user's head.

8. A method as claimed in claim 1, further comprising providing an aligning mechanism on said detail camera.

9. A method as claimed in claim 8, wherein said providing an aligning mechanism further comprises providing a laser to align said detail camera.

10. A method as claimed in claim 1, further comprising detaching said global camera to change the global view being displayed.

11. A method as claimed in claim 5, wherein said pressing a switch turns on a light illuminating a field of view for said detail camera.

12. A method as claimed in claim 1, wherein said providing a global camera further comprises providing a global video camera.

13. A method as claimed in claim 1, wherein said transmitting images from the global camera and transmitting images from the detail camera further comprises transmitting from a same transmitter.

14. A method as claimed in claim 13, further comprising transmitting audio from said same transmitter.

15. A method as claimed in claim 1, further comprising obtaining a high spatial resolution.

16. A method as claimed in claim 1, further comprising providing a focusing mechanism on said detail camera.

17. A method as claimed in claim 1, wherein said transmitting images from the global camera to a remote display further comprises transmitting said images using a cellular phone.

* * * * *